US008712719B2

(12) United States Patent
Klawinski

(10) Patent No.: US 8,712,719 B2
(45) Date of Patent: Apr. 29, 2014

(54) METHOD AND SYSTEM FOR DETECTING CENTER PIVOT COLLISION

(76) Inventor: Brian P. Klawinski, Houston, TX (US)

( * ) Notice: Subject to any disclaimer, the term of this patent is extended or adjusted under 35 U.S.C. 154(b) by 522 days.

(21) Appl. No.: 13/074,711

(22) Filed: Mar. 29, 2011

(65) Prior Publication Data

US 2012/0254091 A1  Oct. 4, 2012

(51) Int. Cl.
*G01P 5/00* (2006.01)

(52) U.S. Cl.
USPC .......................................... 702/142

(58) Field of Classification Search
USPC .......................................... 702/142
See application file for complete search history.

(56) References Cited

U.S. PATENT DOCUMENTS 8,317,114 B1 * 11/2012 Malsam et al. ............... 239/729

* cited by examiner

*Primary Examiner* — Stephen Cherry
(74) *Attorney, Agent, or Firm* — Brian P. Klawinski

(57) ABSTRACT

A system and method is described that allow for detecting center pivot collision and that provide more accurate and reliable collision indications. The system and method described are suitable for low-cost consumer grade GPS devices and other position sensors.

10 Claims, 5 Drawing Sheets

METHOD AND SYSTEM FOR DETECTING CENTER PIVOT COLLISION

BACKGROUND OF THE INVENTION

1. Field of the Invention

The present invention relates generally to the field of agricultural equipment, and particularly to center pivots.

2. Description of the Related Art

Center pivots are commonly used to irrigate large areas of and that are typically a quarter mile on each side. The center pivot includes a base that is attached to the ground and number of segments attached together that are supported on wheels for allowing them to rotate around the base.

Due to landscape and other considerations, there are situations that require farmers to install center pivots in locations where it is possible that the center pivots will collide. Originally, farmers were required to watch their pivots to prevent collisions. With the advent of global position satellites (GPS), farmers were allowed to use computers to detect collisions. The method commonly employed with GPS is the "box method" where a region that center pivots may collide is described with a bounding box. If both pivot enters the box at the same time then action is taken to prevent the collision. The simplistic box method does not take into account the velocity or directions of the pivots and many times will report a collision and shutdown equipment when unnecessary. Current center pivot collision detection systems do not take velocity into account because center pivots move at a slow rate that cannot be detected with current GPS hardware. When a center pivot is shutdown unnecessarily a farmer incurs expenses in restarting the center pivot and for a loss in the yield of the crop. Therefore, there exists a need for a new and improved method and system for detecting collisions between center pivots.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

When referring to the location of a center pivot, the location is the position of the end tower of the center pivot or the farthest most extension of the pivot pipe away from the pivot base.

The location of a center pivot is obtained with a position sensor. While referring to GPS coordinates and devices in conjunction with the figures, those familiar with the art will recognize that other types of position sensors may be utilized. For instance, an encoder type position sensor may be utilized to calculate the location of a center pivot.

As described herein, a database generally refers to the storage of information for later retrieval. A database is not confined to the storage of a single device and includes information that is stored on multiple devices that are in communication with one another.

A processor refers to a single computation device or multiple computational devices working together.

Figure 1:
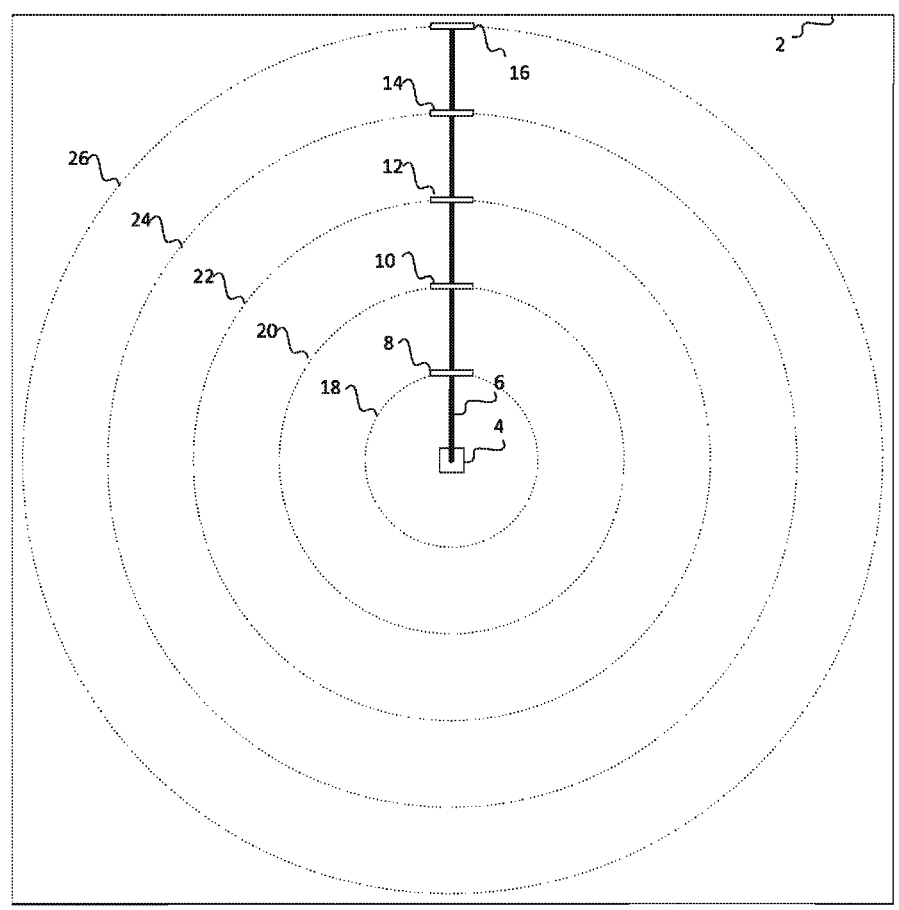
FIG. 1 is a schematic of center pivot.

With reference now to the figures, and in particular with reference to FIG. 1, there is shown an overhead schematic of a center pivot. Center Pivot Base 4 is located near the center of Growing Field 2. The common size of a growing field is one quarter mile by one quarter mile; however, the size of a growing field may vary widely. Center Pivot Base 4 is attached to the ground and includes a rotation mechanism (not shown) that connects to Pivot Pipe 6.

Pivot Pipe 6 is supported by Intermediate Tower 8, 10, 12, and 14. Intermediate Towers 8, 10, 12, and 14 include wheels for allowing tangential movement with respect to Center Pivot Base 4. Paths 18, 20, 22, and 24 show the travel path of intermediate Towers 8, 10, 12, and 14, respectively, as they travel around Growing Field 2. Intermediate Towers 8, 10, 12, and 14 may travel in either clockwise or counter-clockwise direction. Those familiar with the art common refer to clockwise direction as travelling forward and counter-clockwise as travelling in reverse.

Pivot Pipe 6 terminates at End Tower 16. End Tower 16 is similar to Intermediate Towers 8, 10, 12, and 14. In some instances, End Tower 16 may extend Pivot Pipe 6 to further without any additional ground support and include an end gun (not shown) for watering the corners of Growing Field 2.

Figure 2:
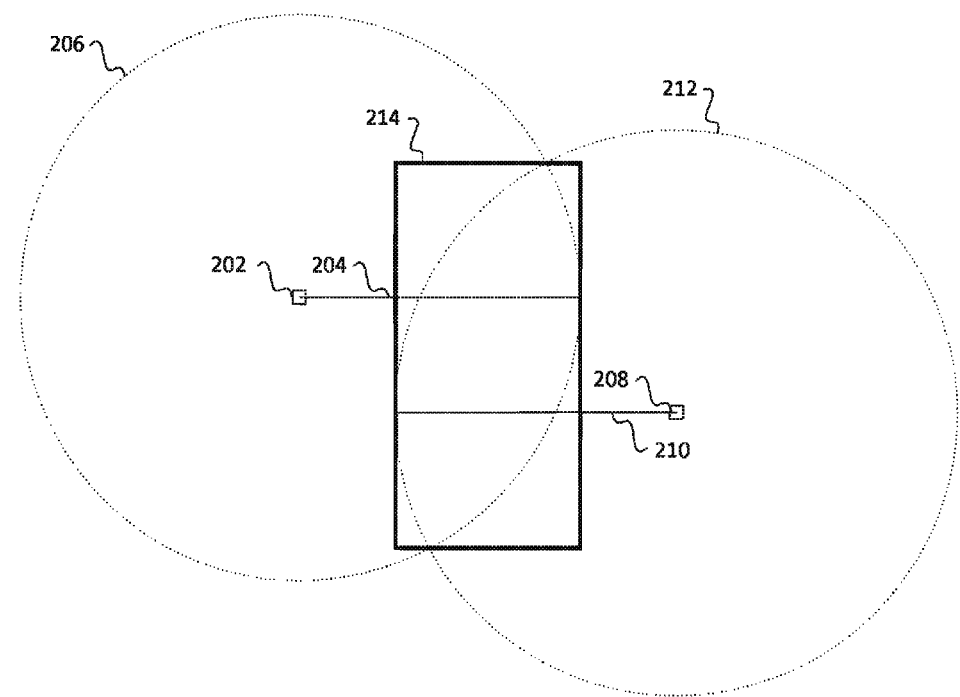
FIG. 2 illustrates the prior art box method for detecting center pivot collision.

With referenced now to FIG. 2, a schematic diagram of the "box method" for detecting center pivot collisions is illustrated. Pivot Base 202 is attached to Pivot Pipe 204 and follows Pivot Path 206. Pivot Base 208 is attached to Pivot Pipe 210 and follows Pivot Path 212. It is apparent from the figure that Pivot Pipe 204 and Pivot Pipe 210 may collide in Pivot Collision Box 214. As Pivot Pipe 204 and 210 travel along their respective paths, a GPS coordinate is monitored. If the GPS coordinate falls within Pivot Collision Box 214 a collision is alerted and the farmer is notified and/or equipment is shut down.

Since center pivots move at a rate below one mile per hour, the velocity of center pivots has previously been unused to assist in determining when pivots would collide. Instead, prior art solutions rely on a the primitive box method that will signal a collision if two center pivots pipes, such as Pivot Pipe 204 and Pivot Pipe 210, enter into a defined box, Pivot Collision Box 214.

The prior art box method does not take into account the direction or velocity of either pivot which results in center pivots being shut off when no collision would have happened.

Without having a means to represent the velocity of the center pivot, the future location of the center pivot may not be predicted. The present invention addresses this shortcoming.

Figure 3:
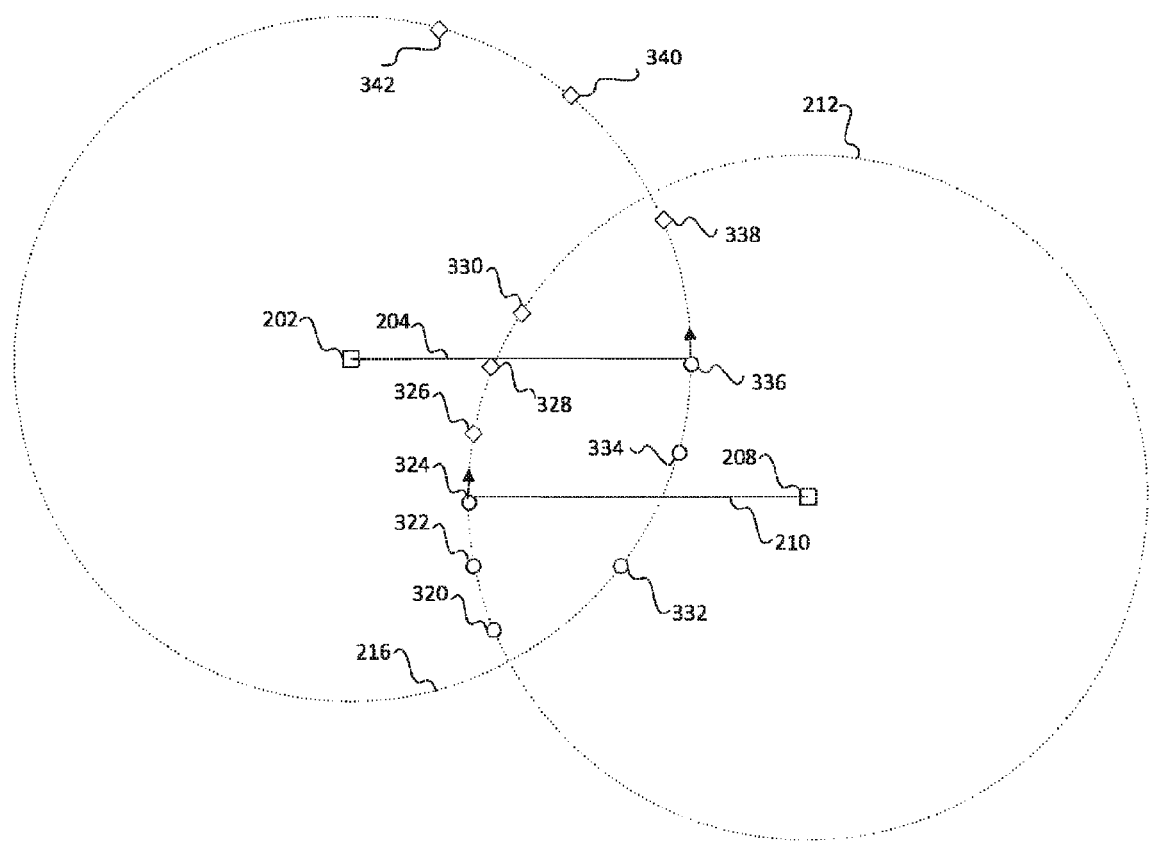
FIG. 3 depicts an example of center pivots in accordance with the present invention.

With referenced now to FIG. 3, a schematic diagram of a preferred embodiment of the present invention for detecting center pivot collisions is depicted. For Center Pivot A comprising Pivot Base 202 and Pivot Pipe 204, a set of recent GPS coordinate and time information is recorded at Location 332, 334, and 336. Similarly, for Center Pivot B comprising Pivot Base 208 and Pivot Pipe 210, a set of recent GPS coordinate and time information is recorded at Location 320, 322, and 324.

Based on the recent GPS information at Location 332, 334, and 336, the angular velocity of Pivot Pipe 204 is calculated. Future Location 338, 340, and 342 represent positions Pivot Pipe 204 will be at future times. Likewise, based on the recent GPS information at Location 320, 322, and 324, the angular velocity of Pivot Pipe 208 is calculated. Future Location 326, 328, and 330 represent positions Pivot Pipe 208 will be at future times.

Figure 4:
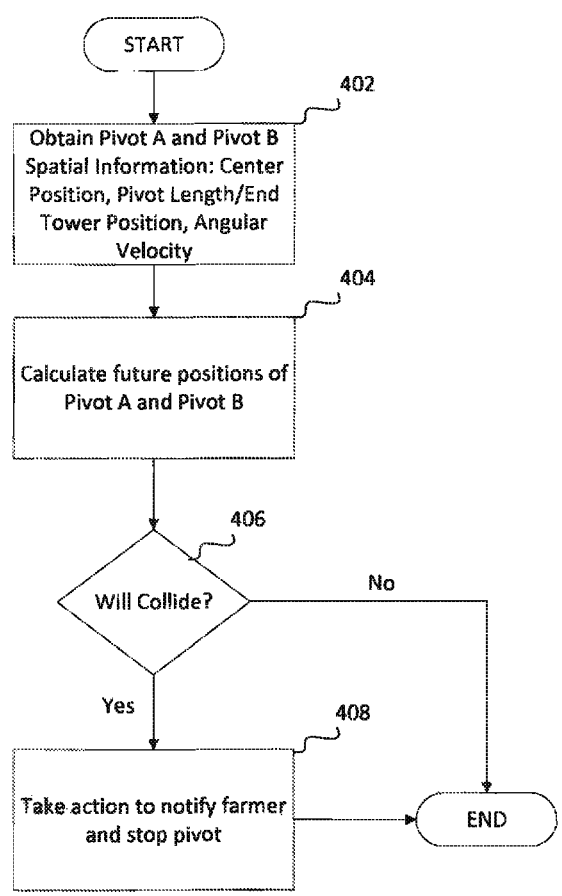
FIG. 4 illustrates a high level flow chart for a preferred embodiment of detecting center pivot collision of the present invention.
Figure 5:
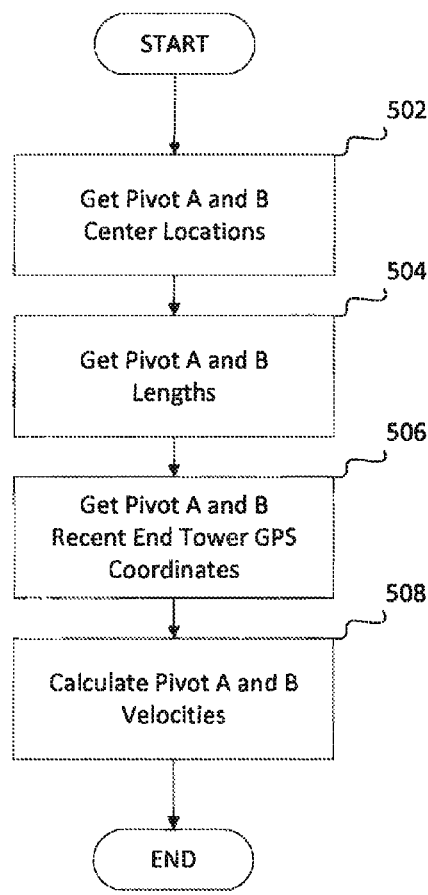
FIG. 5 shows a flow chart for a preferred embodiment of obtaining a center pivot velocity for detecting center pivot collision of the present invention.

The future spatial locations of Center Pivot A and Center Pivot B are compared to determine if the pivots will collide as is further described in conjunction with FIG. 4 and FIG. 5. An added benefit of the present invention is that the time and location of a collision is calculated to allow equipment to operate as long as possible before a shutdown is required.

Those familiar with the art will recognize that while a sample of three previous locations is shown in FIG. 3, any sample size with one or more locations would be sufficient to practice the present invention. Similarly, while three future locations are calculated for the pivot, any set of future locations that have one or more locations is within the scope and spirit of the present invention.

With referenced now to FIG. 4, a flow chart of a preferred embodiment of the present invention for detecting center pivot, collisions is illustrated. By way of example, the flow chart of FIG. 4 shows the process of detecting a collision between Center Pivot A and Center Pivot B. The process begins at Step 402 where spatial information, such as the center pivot base location, center pivot length, end tower location, and velocity are obtained from a database for Center Pivot A and Center Pivot B. In a preferred embodiment, the velocity of the center pivots is calculated in degrees per hour. The process at Step 402 is explained in further detail in conjunction with FIG. 5.

Following Step 402, the process moves to Step 404. At Step 404 one or more future positions of Pivot A and Pivot B are calculated. In a preferred embodiment, the future locations are based on the velocity calculated at Step 402. In yet, another preferred embodiment, the velocity calculated in Step 402 is adjusted such that it is within a minimum and maximum velocity for the pivot.

At decision Step 406 a determination is made if Pivot A and Pivot B will collide. The decision is based on comparing the locations of Pivot A and Pivot B in the future. If Pivot A and Pivot B will occupy the same space at any of the future locations, a collision is indicated and the process advances to Step 408, if no collision is indicated then the process ends.

In a preferred embodiment, the determination at Step 406 factors in a safety margin, expressed in a linear measurement such as feet. If Pivot A and Pivot B will be at any calculated future time less than the safety margin apart, a collision is indicated. Additionally, the distance between Pivot A and Pivot B is calculated as the closest distance between the pivot pipes. In yet another preferred embodiment, the distance between the center pivots is calculated as the distance between the center pivot end towers.

Following a determination of a collision, the process advances to Step 408. At Step 408, the farmer or equipment operator is notified of the collision and the center pivots are stopped. In a preferred embodiment, the farmer or equipment operator is notified in advance of the collision and given time to make corrections to the center pivots if the collision will not take place in the immediate future.

With referenced now to FIG. 5, a flow chart for a preferred embodiment of obtaining a center pivot velocity for detecting center pivot collision of the present invention is shown. Those familiar with the art will recognize that the steps show in FIG. 5 may be executed in different orders or in parallel without departing from the spirit and scope of the present invention.

In a preferred embodiment, the process of calculating the velocities for two center pivots, Center Pivot A and Center Pivot B, being checked for collision starts at Step 502. At Step 502 the center locations for Center Pivot A and Center Pivot B are retrieved from a database. The center locations are expressed in longitude and latitude coordinates.

The process advances to Step 504 where the lengths of Center Pivot A and Center Pivot B are retrieved from a database. The length of the pivots is expressed in feet, but other embodiments may use other units of measure.

After Step 504, the process moves to Step 506 where recent locations are retrieved for Center Pivot A and Center Pivot B. The recent locations include a coordinate and a time the center pivot was at the coordinate. In a preferred embodiment, the number of recent locations is two or more. Further, in a preferred embodiment, the recent locations include the current location of the pivot.

The process then advances to Step 508. At Step 508 the velocities of Center Pivot A and Center Pivot B are calculated based on the recent locations, in a preferred embodiment, the average angular velocity between the recent locations is calculated.

For an embodiment that does not utilize the current location of a pivot, the current location is calculated based on the last reported location, time since the last reported location, and the average angular velocity.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A system for detecting collisions between a center pivot A and a center pivot B comprising:
   a database, said database comprising storage for a center location for the center pivot A, a center location for the center pivot B, a length for center pivot A, a length for center pivot B;
   a position sensor for center pivot A;
   a position sensor for center pivot B; and
   a velocity processor for calculating one or more future locations for center pivot A and for calculating one or more future locations for center pivot B.

2. The system for detecting collisions of claim 1, wherein said database further comprises:
   storage for one or more recent position with time information for center pivot A; and
   storage for one or more recent position with time information for center pivot B.

3. The system for detecting collisions of claim 2, where said velocity processor utilizes the one or more recent position with time information for center pivot A to calculate an average velocity for center pivot A and the one or more recent position with time information for center pivot B to calculate an average velocity for center pivot B.

4. The system for detecting collisions of claim 3, wherein the average velocity for center pivot A and the average velocity for center pivot B are angular velocities.

5. The system for detecting collisions of claim 1, said system further comprising:
- a collision processor calculating if the center pivot A and the center pivot B will collide at a future time based on the one or more future locations for the center pivot A and the one or more future locations for the center pivot B.

6. The system for detecting collisions of claim 1, wherein the position sensor for center pivot A is a GPS receiver.

7. A method for detecting collisions between a center pivot A and a center pivot B comprising the steps:
- storing one or more recent position and time entries for the center pivot A;
- storing one or more recent position and time entries for the center pivot B;
- calculating a velocity for the center pivot A;
- calculating a velocity for the center pivot B;
- calculating, using a processor, one or more future locations for the center pivot A based on the calculated velocity for the center pivot A;
- calculating one or more future locations for the center pivot B based on the calculated velocity for the center pivot B; and
- determining if the center pivot A will collide with the center pivot B based on the one or more future locations for the center pivot A and the one or more future locations for the center pivot B.

8. The method for detecting collisions of claim 7, wherein the step of calculating the velocity for the center pivot A comprising the steps:
- retrieving a center position for the center pivot A;
- retrieving a pivot length for the center pivot A;
- retrieving the one or more recent positions and time entries for the center pivot A; and
- calculating a velocity based on the one or more recent position and time entries for the center pivot A.

9. The method for detecting collisions of claim 8, wherein the calculated velocity is an angular velocity.

10. The method for detecting collisions of claim 8, wherein the calculated velocity is adjusted to be within a minimum velocity and a maximum velocity.

\* \* \* \* \*